No. 826,880. PATENTED JULY 24, 1906.
J. H. PITKIN.
EAR RETARDER FOR CORN HUSKING MACHINES.
APPLICATION FILED NOV. 10, 1905.

Witnesses:
T. L. Hynds.
J. N. Daggett.

Inventor
Julian H. Pitkin.
By
J. C. Warnes,
Attorney.

THE NORRIS PETERS CO., WASHINGTON, D. C.

UNITED STATES PATENT OFFICE.

JULIAN H. PITKIN, OF CHICAGO, ILLINOIS, ASSIGNOR TO INTERNATIONAL HARVESTER COMPANY, A CORPORATION OF NEW JERSEY.

EAR-RETARDER FOR CORN-HUSKING MACHINES.

No. 826,880.      Specification of Letters Patent.      Patented July 24, 1906.

Application filed November 10, 1905. Serial No. 286,676.

*To all whom it may concern:*

Be it known that I, JULIAN H. PITKIN, a citizen of the United States, residing at Chicago, in the county of Cook and State of Illinois, have invented a new and useful Improvement in Ear-Retarders for Corn-Husking Machines, of which the following is a complete specification.

This invention relates to means for presenting and retaining the ears of corn in proper relation with respect to the husking-rollers operating upon them, the object being to provide improved means for such purpose.

Figure 1:
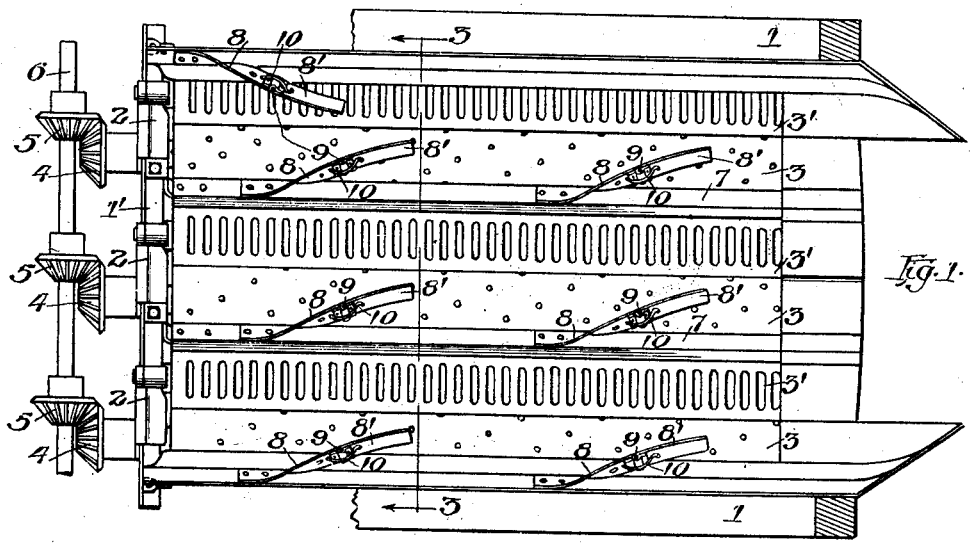
Figure 2:
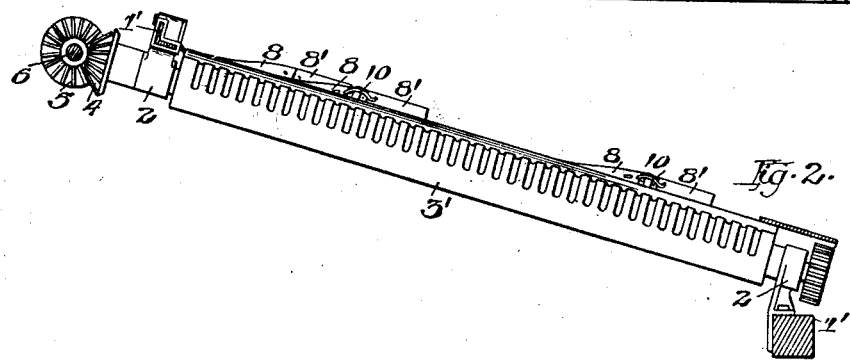
Figure 3:
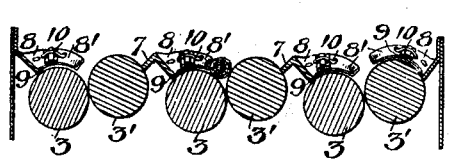
Figure 5:
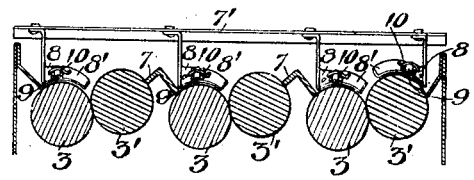
Figure 4:
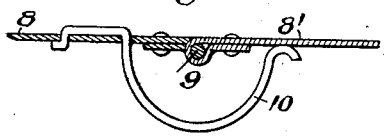

Referring to the accompanying drawings, Figure 1 represents a plan view of the husking-rolls and adjacent parts of a corn-husking machine in connection with which the present invention is shown. Fig. 2 is a side elevation of a pair of husking-rollers with the ear-retarders in operative relation therewith. Fig. 3 is a transverse section taken as indicated by the line 3 3 in Fig. 1. Fig. 4 is an enlarged detail section showing the construction of the hinge-joint in the ear-retarders, and Fig. 5 illustrates a modified construction of the support for the ear-retarders.

In the drawings, 1 designates a portion of the longitudinal sills of a corn husker and shredder, and 1' the cross-bars, and in suitable bearings 2 thereon are mounted the several pairs of husking-rolls 3 and 3'. The husking-rolls 3 and 3' are grouped in pairs, one of the rollers 3 of each pair being placed, as is common in such devices, in a plane slightly below its coöperating rolls 3'. The rollers may be driven in any suitable manner. The shafts of the rolls 3 are extended and provided at their ends with the bevel-gears 4, which mesh with and are driven by the bevel-gears 5 on the cross-shaft 6.

Between the several pairs of husking-rolls are secured the longitudinally-extending angle-bars 7, which not only constitute supports for the ear-retarders 8, but also form braces for the cross-bars 1' and shields to keep the ears of corn from lodging between the several pairs of rolls. Other constructions of support for the ear-retarders could be used—for instance, such as shown in Fig. 5, in which the support 7' is located some distance above the rolls, and the ear-retarder is made to bend upwardly and engage same.

The ear-retarders 8 are formed of downwardly-projecting elastic strips or blades secured to the angle-bars 7, twisted and deflected inwardly, as shown. The blades are twisted to conform approximately to the curvature of the lower rolls, over which they extend and in such a manner as to present a flat surface at their extremity to the ears of corn, which it presses against the face of the rollers. The blades form, in effect, sections of a helix, of a very extended pitch. Their function is to deflect the ears of corn between coöperating pairs of rolls to compel them to slide singly down said rolls and to press the ears into positive engagement therewith. From an inspection of Fig. 2 it will be seen that the rolls are placed, as is customary in this class of machines, at an inclination sufficient to cause the ears to slide by gravity along their course.

In order to render the lower or free ends of the blades of the ear-retarders more yielding, the lower portions 8' of said blades are hinge-connected and spring-held to the upper or more rigid portion, the pin 9 forming the axis of the hinge-joint and the spring 10 permitting the blade 8' to yield upwardly.

What I claim as my invention, and desire to secure by Letters Patent, is—

1. In a corn-husking machine, in combination, a pair of husking-rollers, suitable bearings in which said rollers are journaled, downward and inwardly inclined elastic ear-retarders arranged above said husking-rollers, said ear-retarders being twisted to a helical shape to conform to the husking-roller over which it is placed and presenting at its extremity a flat surface to the ear operated upon, and suitable supports for said ear-retarders, substantially as and for the purpose specified.

2. In a corn-husking machine, in combination, a pair of husking-rollers, suitable bearings in which said rollers are journaled, ear-retarder supports located adjacent to said rollers, and downwardly and inwardly projecting ear-retarders secured to said supports, said ear-retarders comprised of an upper rigid portion and a lower spring-held blade hinge-connected therewith, substantially as and for the purpose specified.

3. In a corn-husking machine, in combination, a pair of husking-rollers, suitable bearings in which said rollers are journaled, ear-retarder supports located adjacent to said rollers, and downwardly-projecting twisted and inwardly-deflected ear-retarders secured to said supports, said ear-retarders each comprised of an upper rigid portion and a lower spring-held blade hinge-connected therewith, substantially as and for the purpose specified

JULIAN H. PITKIN.

Witnesses:
OSCAR A. ANDERSON,
SIDNEY W. NICHOLLS.